United States Patent
Fukuda (10) Patent No.: US 7,949,258 B2
(45) Date of Patent: May 24, 2011

(54) RADIO COMMUNICATION SYSTEM, RADIO COMMUNICATION APPARATUS AND RADIO COMMUNICATION METHOD AS WELL AS COMPUTER PROGRAM

(75) Inventor: Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 591 days.

(21) Appl. No.: 11/629,416

(22) PCT Filed: May 16, 2005

(86) PCT No.: PCT/JP2005/008904
§ 371 (c)(1),
(2), (4) Date: Dec. 12, 2006

(87) PCT Pub. No.: WO2006/001134
PCT Pub. Date: Jan. 5, 2006

(65) Prior Publication Data
US 2008/0298808 A1    Dec. 4, 2008

(30) Foreign Application Priority Data
Jun. 28, 2004  (JP) .................. 2004-190194

(51) Int. Cl.
*H04N 5/225* (2006.01)
*H04N 55/775* (2006.01)
*G06F 15/173* (2006.01)

(52) U.S. Cl. ........ 398/106; 398/107; 398/108; 398/109; 398/110; 340/572; 340/10.1; 709/223

(58) Field of Classification Search .................. 398/106, 398/107–114
See application file for complete search history.

(56) References Cited

U.S. PATENT DOCUMENTS

| 4,916,296 | A | * | 4/1990 | Streck ........................... 235/454 |
| 5,444,742 | A | * | 8/1995 | Grabow et al. ................ 375/267 |
| 5,546,211 | A | * | 8/1996 | Devon ............................ 398/98 |
| 5,617,236 | A | * | 4/1997 | Wang et al. .................... 398/117 |
| 5,710,651 | A | * | 1/1998 | Logan, Jr. ..................... 398/168 |
| 5,873,025 | A | * | 2/1999 | Evans et al. ................. 455/63.1 |
| 5,929,770 | A | * | 7/1999 | Faita ........................ 340/10.41 |

(Continued)

FOREIGN PATENT DOCUMENTS

CN    1395792 A    2/2003

(Continued)

OTHER PUBLICATIONS

Transaltion of WO 03/092265, Takahashi.*

(Continued)

*Primary Examiner* — Ken N Vanderpuye
*Assistant Examiner* — Oommen Jacob
(74) *Attorney, Agent, or Firm* — Lerner, David, Littenberg, Krumholz & Mentlik, LLP (57) ABSTRACT

It is possible to realize remote control in a reflection wave transmission system, and enhance operability for a mobile apparatus having a reflector. The mobile apparatus comprises a reflector and performs reflection wave transmission by carrying data on a reflection wave for unmodulated carrier. A reflection wave reader comprises an infrared light receiving section, receives and decodes a request signal sent as an infrared remote control command, transmits it to the mobile apparatus by an ASK modulated signal and then transmits the unmodulated carrier. The mobile apparatus transmits requested data by reflection wave. The mobile apparatus can be operated from an infrared remote controller and remote control distance can be extended.

13 Claims, 7 Drawing Sheets

U.S. PATENT DOCUMENTS

| | | | |
|---|---|---|---|
| 5,952,996 A * | 9/1999 | Kim et al. | 345/158 |
| 6,046,683 A * | 4/2000 | Pidwerbetsky et al. | 340/10.4 |
| 6,243,012 B1 * | 6/2001 | Shober et al. | 340/572.7 |
| 6,429,828 B1 | 8/2002 | Tinaphong et al. | |
| 6,441,936 B1 * | 8/2002 | Kinstler | 398/106 |
| 2002/0044058 A1 | 4/2002 | Heinrich et al. | |
| 2002/0044199 A1 * | 4/2002 | Barzebar et al. | 348/14.01 |
| 2002/0063781 A1 * | 5/2002 | Aizawa | 348/211 |
| 2002/0097165 A1 * | 7/2002 | Hulme | 340/825.72 |
| 2002/0118886 A1 * | 8/2002 | Hwang et al. | 382/250 |
| 2002/0154337 A1 * | 10/2002 | Sakata | 358/1.16 |
| 2002/0194619 A1 * | 12/2002 | Chang et al. | 725/134 |
| 2003/0025082 A1 * | 2/2003 | Brewington et al. | 250/341.8 |
| 2003/0038879 A1 * | 2/2003 | Rye et al. | 348/153 |
| 2003/0058155 A1 * | 3/2003 | Landt | 342/42 |
| 2003/0117499 A1 * | 6/2003 | Bianchi et al. | 348/211.2 |
| 2003/0165342 A1 * | 9/2003 | Popineau | 398/127 |
| 2004/0075066 A1 * | 4/2004 | Hasegawa et al. | 250/556 |
| 2004/0080537 A1 | 4/2004 | Adler | |
| 2004/0090424 A1 * | 5/2004 | Hurley et al. | 345/169 |
| 2004/0098739 A1 * | 5/2004 | Rakib | 725/15 |
| 2004/0101295 A1 * | 5/2004 | Clark | 396/56 |
| 2004/0143501 A1 * | 7/2004 | Lopez et al. | 705/14 |
| 2004/0150510 A1 * | 8/2004 | Taki et al. | 340/10.1 |
| 2004/0150723 A1 * | 8/2004 | Seo et al. | 348/207.1 |
| 2004/0212479 A1 * | 10/2004 | Gilbert et al. | 340/10.34 |
| 2004/0215750 A1 * | 10/2004 | Stilp | 709/220 |
| 2004/0223764 A1 * | 11/2004 | Takahashi et al. | 398/106 |
| 2004/0239761 A1 * | 12/2004 | Jin et al. | 348/153 |
| 2005/0005298 A1 * | 1/2005 | Tranchina | 725/81 |
| 2005/0069682 A1 * | 3/2005 | Tseng | 428/195.1 |
| 2005/0156039 A1 * | 7/2005 | Carrender et al. | 235/439 |
| 2005/0219838 A1 * | 10/2005 | Belliveau | 362/120 |
| 2005/0246747 A1 * | 11/2005 | Braun et al. | 725/81 |
| 2005/0253688 A1 * | 11/2005 | Fukuda | 340/10.4 |
| 2006/0019705 A1 * | 1/2006 | Fukuda | 455/556.1 |
| 2006/0022801 A1 * | 2/2006 | Husak et al. | 340/10.5 |
| 2006/0025957 A1 * | 2/2006 | Lind et al. | 702/127 |
| 2006/0028398 A1 * | 2/2006 | Willmore | 345/2.3 |
| 2006/0031438 A1 * | 2/2006 | Tokuhashi et al. | 709/223 |
| 2006/0046655 A1 * | 3/2006 | Terashima | 455/41.2 |
| 2006/0098099 A1 * | 5/2006 | Koide | 348/211.2 |
| 2006/0109085 A1 * | 5/2006 | Tiernay et al. | 340/10.1 |
| 2006/0139324 A1 * | 6/2006 | Lin | 345/158 |
| 2006/0143163 A1 * | 6/2006 | Smith et al. | 707/3 |
| 2006/0197014 A1 * | 9/2006 | Inuiya | 250/239 |
| 2007/0051872 A1 * | 3/2007 | Goldberg et al. | 250/208.1 |
| 2007/0054639 A1 * | 3/2007 | Bauman | 455/222 |
| 2007/0243851 A1 * | 10/2007 | Shoarinejad et al. | 455/343.2 |

FOREIGN PATENT DOCUMENTS

| | | |
|---|---|---|
| EP | 1646155 | 4/2006 |
| EP | 1646155 A1 | 4/2006 |
| JP | 1-182782 A | 7/1989 |
| JP | 1-185473 A | 7/1989 |
| JP | 5-347719 A | 12/1993 |
| JP | 09-027772 A | 1/1997 |
| JP | 2001-060907 A | 3/2001 |
| JP | 2001-526481 A | 12/2001 |
| JP | 2004-104653 A | 4/2004 |
| WO | 03/015451 A1 | 2/2003 |
| WO | WO 03092265 A1 * | 11/2003 |

OTHER PUBLICATIONS

Translation of WO 03092265 A1.*
Supplementary European Search Report, EP 05739241, dated May 7, 2010.
Finkenzeller, Klaus, "RFID-Handbook", Chapter 11, pp. 319-339, Sep. 26, 2002, XP002445050.

* cited by examiner

RADIO COMMUNICATION SYSTEM, RADIO COMMUNICATION APPARATUS AND RADIO COMMUNICATION METHOD AS WELL AS COMPUTER PROGRAM

TECHNICAL FIELD

This invention relates to a radio communication system, a radio communication apparatus and a radio communication method as well as a computer program wherein communication action at low power consumption is implemented between apparatus at comparatively short distances. Particularly, the present invention relates to a radio communication system of the back scatter type, a radio communication apparatus and a radio communication method as well as a computer program wherein transmission a non-modulated carrier from a reflected wave reader side and modulation of a reflected wave based on a changeover operation of the antenna load impedance on the reflector side are utilized to perform data communication.

More particularly, the present invention relates to a radio communication system, a radio communication apparatus and a radio communication method as well as a computer program wherein data on a mobile apparatus is read efficiently at low power consumption by reflected wave transmission. More specifically, the present invention relates to a radio communication system, a radio communication apparatus and a radio communication method as well as a computer program wherein data is read out from a mobile apparatus having a reflector function and processing of reception data such as displaying outputting is performed efficiently with high operability.

BACKGROUND ART

Efficient transmission of a command or data, sharing of information resources and sharing of hardware resources can be implemented by interconnecting a plurality of apparatus into a network. Further, attention is paid recently to a radio network as a system which releases a user from wiring according to a wired system.

As standard specifications relating to a radio network, the IEEE (The Institute of Electrical and Electronics Engineers) 802.11, HiperLan/2, IEEE 802.15.3, Bluetooth communication and so forth are available. In recent years, a radio LAN system has been popularized remarkably because it has become less expensive and is built as a standard element also in a PC.

A radio communication system of a comparatively small scale is used for data transmission between a host apparatus and a terminal apparatus in a home or the like. As an example of the host apparatus here, set down type domestic appliances such as a television set, a monitor, a printer, a PC, a VTR and a DVD player are available. Meanwhile, as an example of the terminal apparatus, mobile type apparatus whose power consumption is suppressed to the minimum such as a digital camera, a video camera, a portable telephone set, a personal digital assistant and a portable music reproduction apparatus are available. An application of a system of the type described is to upload image data taken up using a portable telephone set with a camera or a digital camera into a PC through a radio LAN or the like.

For example, a digital camera which is advantageous in that it performs Bluetooth communication favorably has been proposed (refer to, for example, Patent Document 1). A digital camera includes a case and a shutter button provided on the case, and the shutter button is provided at one of end portions in the leftward and rightward direction of an upper portion of the case. Further, an antenna for Bluetooth communication is provided at the other end portion in the leftward and rightward direction at an upper portion of the case within the case.

However, a radio LAN has been designed and developed originally supposing utilization with a computer, and where it is incorporated in a mobile type apparatus, the power consumption of the mobile type apparatus matters. Most of radio LAN cards of the IEEE 802.11b currently on the market exhibit power consumption of 800 W or more upon transmission and 600 W or more upon reception. The power consumption imposes a heavy burden on a battery-driven portable apparatus.

Even if a radio LAN function is caused to operate restrictively at a short distance to decrease the transmission power, the power consumption can be reduced only by approximately 80%. Particularly since transmission from an image inputting apparatus such as a digital camera to the image display apparatus side is performed in such a communication form that the transmission ratio occupies most of the entire communications, radio transmission measures of further reduced power consumption are demanded.

Further, in Bluetooth communication, the transmission rate is as low as 720 kbps at the highest, and it is inconvenient that much transmission time is required for transmission of an image which has been enhanced in the picture quality and increased in the file size recently.

In contrast, according to radio transmission which utilizes a reflected wave based on the back scatter system used in RFID, reduction in power consumption can be implemented, for example, in such a communication form that the transmission ratio between apparatus occupies most of communications.

A ratio communication system of the back scatter type includes a reflector for transmitting data in the form of a reflected wave for which a modulation process is performed, and a reflected wave reader for reading the data from the reflected wave from the reflector. Upon data transmission, the reflected wave reader transmits a non-modulated carrier. In contrast, the reflector applies a modulation process to the non-modulated carrier in accordance with transmission data using a load impedance operation such as, for example, turning on/off of termination of an antenna to signal the data. Then, the reflected wave reader side can receive the reflected wave and perform a demodulation and decoding process for the received reflected wave to acquire the transmission data.

The reflector includes an antenna for reflecting incoming a radio wave, for example, of a continuous wave, a generation circuit for transmission data, and an impedance variation circuit for varying the impedance of the antenna in accordance with the transmission data (refer to, for example, Patent Document 2).

In a reflected wave transmission system, an antenna switch for varying the load impedance of an antenna (that is, for performing modulation of a reflected wave) is usually formed from a gallium arsenide IC. The power consumption of the antenna switch is several tens μW or less, and the average power when data transmission is performed is 10 mW or less in the case of a delivery confirmation system and is several tens μW in one-way transmission with which data transmission can be performed. Where the average power is compared with average power consumption of a general radio LAN, it exhibits an overwhelming difference in performance (refer to, for example, the specification of Japanese Patent Application No. 2003-291809). Accordingly, even where a terminal apparatus for information storage is incorporated in a battery-driven mobile apparatus such as a digital camera, the battery life can be extended significantly by reducing the power consumption upon data transmission action.

Figure 5:
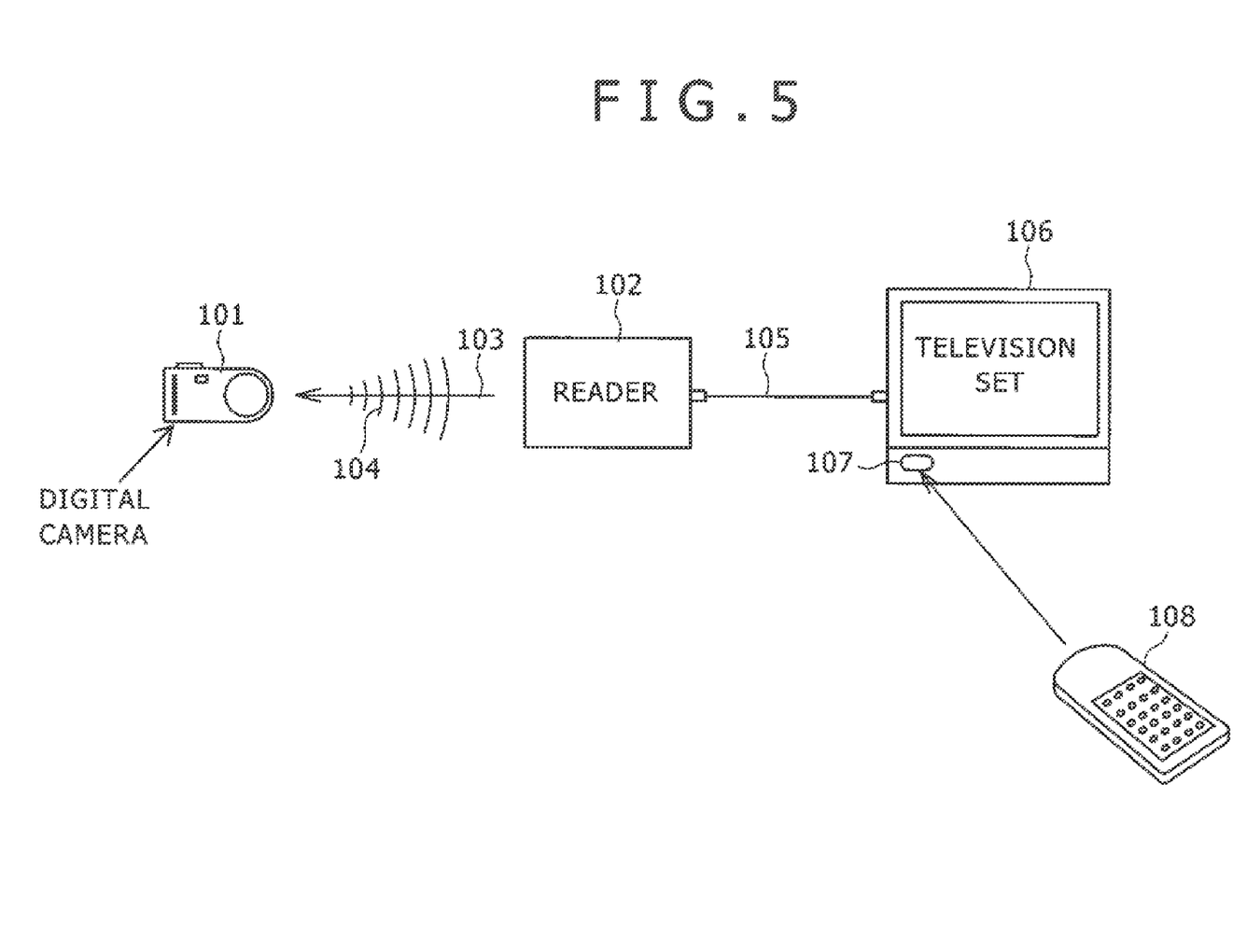
FIG. 5 is a view showing a configuration of a radio data transmission system which utilizes a reflected wave transmission system.

FIG. 5 shows an example of a configuration of a radio data transmission system which utilizes a reflected wave transmission system.

The system shown includes a digital camera 101 with a reflected wave transmission function, a reflected wave reader 102, a television set 106, and an infrared remote controller 108. A video output of the reflected wave reader 102 is connected to an external video input terminal of the television set 106 by a video cable 105.

A non-modulated carrier 103 is transmitted from the reflected wave reader 102, and JPEG (Joint Photographic Experts Group) image data is returned as a reflected wave from the digital camera 101. The transmission of the image data is controlled from an operation section (hereinafter described) of the digital camera 101.

The infrared remote controller 108 provides a control signal to an infrared reception section 107 of the television set 106 and is used for changeover of a channel of the video or the like.

Figure 6:
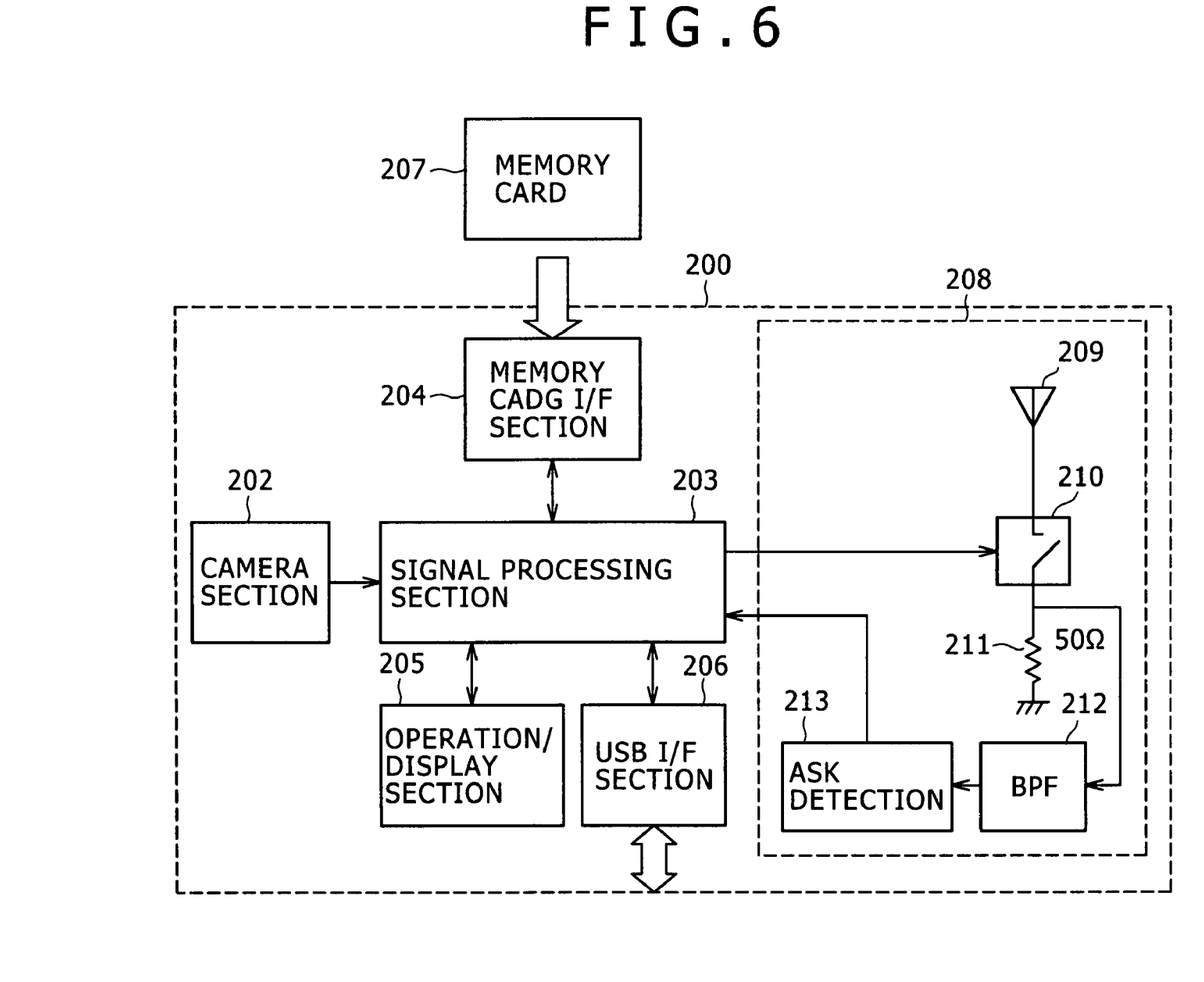
FIG. 6 is a view schematically showing a configuration of a digital camera with a radio data transmission function.

FIG. 6 schematically shows a configuration of a digital camera with a radio data transmission function. Reference numeral 200 denotes a digital camera with a radio data transmission function. The digital camera itself includes a camera section 202, a signal processing section 203, a memory card interface section 204, an operation/display section 205, a USB interface section 206, and a radio transmission module 208.

The signal processing section 203 converts image data inputted from the camera section 202 into image data of a predetermined format such as the JPEG format and stores the image data into an external memory card 207 through the memory card interface section 204.

The operation display section 205 performs image display, various settings and so forth. The USB interface section 206 is used to perform image transfer to a PC using the USB interface.

The radio transmission module 208 includes an antenna 209, an antenna switch 210, an antenna load 211, a band-pass filter 212, and an ASK detection section 213. In the present embodiment, the 2.4 GHz band is used as a frequency of radio waves.

Where image transfer is to be performed, when the radio transmission module 208 receives image data read out from the memory card 207 by the signal processing section 203, it performs on/off actions of the antenna switch 210 connected to the antenna 209 in accordance with a bit image of the data. For example, when the data is 1, the antenna switch 210 is turned on, but when the data is 0, the antenna switch 210 is turned off.

As seen in the figure, when the antenna switch 210 is on, the antenna 209 is terminated by the antenna load 211 of 50Ω, but when the antenna switch 210 is off, the antenna 209 is open. Since this action provides a behavior of termination of a radio wave arriving from a transfer destination when the antenna switch 210 is on and another behavior of reflection of the radio wave when the antenna switch 210 is off, the transfer destination can read image data by detecting reflection of a transmitted radio wave. In other words, image data is transmitted as a reflected wave of a radio wave from the transfer destination which is caused by variation of the antenna load impedance caused by on/off operations of the antenna switch 210, and so-called back scatter communication is implemented. A reflected wave signal from the radio transmission module 208 is equivalent to an ASK modulated wave. Further, also it is possible to produce a PSK modulated wave by varying the load impedance between an open state and a shorted state (antenna load 211=0Ω).

The antenna switch 210 is usually formed from a gallium arsenide IC and exhibits power consumption of several tens μW or less. According to the reflected wave transmission described above, the antenna switch 210 can implement radio image transmission of very low power transmission within a range of the transmission distance of up to approximately 5 m.

The band-pass filter 212 and the ASK detection section 213 are used upon reception of an ASK modulated delivery confirmation signal from the transfer destination. However, the two blocks are unnecessary for one-way transmission wherein delivery confirmation of transmission is not performed. On the other hand, where delivery confirmation is performed, the control therefor is performed by the signal processing section 203.

The band-pass filter 212 is used in order to pass a frequency of the 2.4 GHz band therethrough but attenuate the other frequency bands. The power consumption of the ASK detection section 213 necessary to perform delivery confirmation can be implemented with 30 mW or less.

Accordingly, the average power when the radio communication apparatus shown in FIG. 6 performs data transmission of image data or the like is 10 mW or less in the case of the delivery confirmation system but is several tens μW in the case of one-way transmission to achieve data transfer. This is an overwhelming performance difference when compared with the average power consumption of a general radio LAN.

Figure 7:
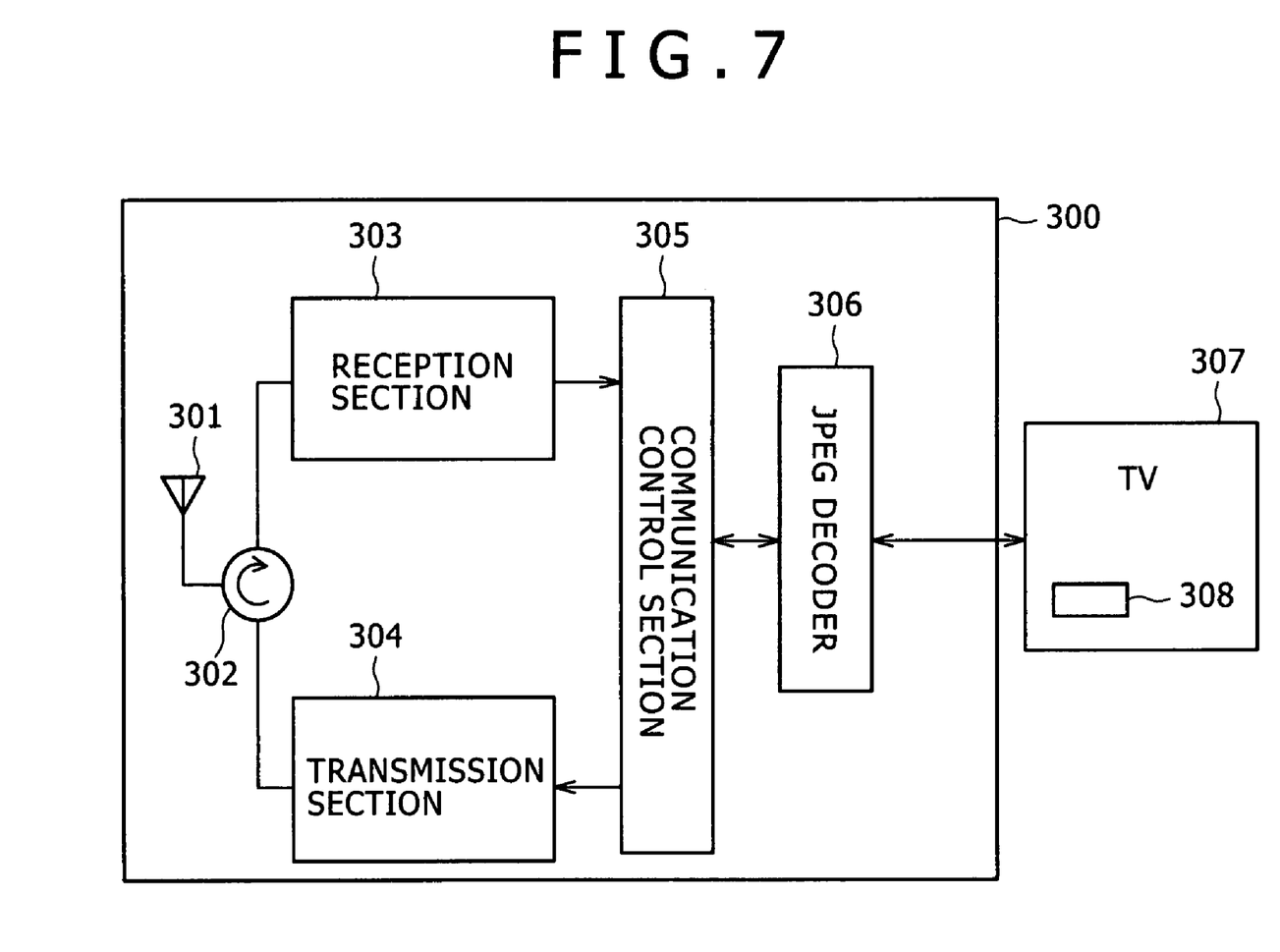
FIG. 7 is a view schematically showing a hardware configuration of a reflected wave reader which receives transmission data from a radio communication apparatus shown in FIG. 6.

FIG. 7 schematically shows a hardware configuration of the reflected wave reader which receives transmission data from the radio communication apparatus shown in FIG. 6.

As described hereinabove, image data is transmitted from the digital camera which it is carried on a reflected wave. Accordingly, the reflected wave reader 300 transmits a non-modulated carrier for producing a reflected wave and performs reception and demodulation of a signal reflected thereto or decoding of image data. The reflected wave reader 300 includes an antenna 301 for the 2.4 GHz band, a circulator 302, a reception section 303, a transmission section 304, a communication control section 305, and a JPEG decoder 306.

As an instruction is provided from the communication control section 305 to the transmission section 304, a non-modulated carrier is transmitted from the reflected wave reader 300. The non-modulated carrier outputted from the transmission section 304 is signaled from the antenna 301 through the circulator 302.

A reflected wave modulated with the image data from the digital camera 200 is received by the reception section 303 through the antenna 301 and the circulator 302 and demodulated by the communication control section 305.

The data demodulated by the communication control section 305 is converted from JPEG data into an analog AV signal (or an NTSC signal) by the JPEG decoder section 306 so that an image of the data can be observed on a television set 307 connected to the reflected wave reader 300. The communication control section 305 performs also communication control with the digital camera 200 and performs transmission of a control signal of delivery confirmation information or the like by ASK through the transmission section 304.

In FIG. 7, reference numeral 308 denotes an infrared reception section. The infrared reception section 308 receives a control signal from the infrared remote controller 108 and issues an instruction to the body of the television set 307.

Here, the inventors of the present invention consider that such a reflected wave transmission system as described has such subjects as described below.

When an image of the digital camera 101 is to be displayed on the television set 106, the user would change over the video input channel first using the infrared remote controller 108. Thereafter, the user would operate the operation/display section 205 of the digital camera 101 to perform selection of an image to be displayed and then perform transmission of image data.

Further, if the user does not perform operations of two devices of the infrared remote controller 108 and the digital camera 101, then the television set 106 cannot display an image, and cumbersome operations are required. Further, it is not considered that various operations on the operation/display section 205 of the digital camera 101 are good in operability also from the size of the operation buttons.

[Patent Document 1]
Japanese Patent Laid-open No. 2004-56711
[Patent Document 2]
Japanese Patent Laid-open No. Hei 01-182782

DISCLOSURE OF THE INVENTION

Problem to be Solved by the Invention

An object of the present invention resides in provision of a radio communication system of the back scatter type, a radio communication apparatus and a radio communication method as well as a computer program which are superior in that data communication can be performed favorably making use of transmission of a non-modulated carrier from the reflected wave reader side and modulation of a reflected wave based on a changeover operation of the antenna load impedance on the reflector side and so forth.

Another object of the present invention resides in provision of a radio communication system, a radio communication apparatus and a radio communication method as well as a computer program which are superior in that data on a mobile apparatus can be read efficiently at low power consumption through reflected wave transmission.

A further object of the present invention resides in provision of a radio communication system, a radio communication apparatus and a radio communication method as well as a computer program which are superior in that reading of data from a mobile apparatus which includes a reflector function and processing of reception data such as displaying outputting can be performed efficiently with high operability.

Means for Solving the Problem

The present invention has been made in view of the subject described above, and provides a radio communication system characterized in that reflected wave transmission is performed by transmission of a carrier from a reflected wave reader side and modulation of a reflected wave with transmission data on a reflector side, wherein the reflected wave reader includes an infrared reception section configured to receive an infrared command and an infrared command decoding section configured to decode the infrared command and controls a reflected wave transmission action in response to the infrared command.

It is to be noted that the term "system" here is used to represent an entire apparatus composed of a logical set of a plurality of devices (or functioning modules which implement predetermined functions) particularly irrespective of whether or not the devices or functioning modules are included in a single housing.

The radio transmission system according to the present invention is directed to implementation of reduced power consumption in such a communication form that the transmission ratio between apparatus restricted at comparatively short distances occupies most of communications. In the radio transmission system, radio transmission is performed making use of modulation of a reflected wave based on the back scatter system used in RFID. An RFID system itself is widely known as an example of radio communication measures which can be applied at short distances in the pertaining field.

Where the radio transmission system according to the present invention is utilized, a host apparatus such as, for example, a PC or a TV receiver which has a reflected wave reader function can read data efficiently at low power consumption from a mobile apparatus such as a digital camera which has a reflector function and perform processing of reception data such as outputting of the data so as to be displayed on the screen or printing out of the data.

Here, an operation of the host apparatus of reading data using reflected wave transmission from the mobile apparatus and an operation of displaying and outputting the read data on the host apparatus or a like operation must be performed separately, and there is a problem that the operability is poor. For example, where an operation of a host apparatus such as a television receiver is performed using an infrared remote controller, the operation is cumbersome.

In contrast, according to the present invention, a host apparatus which has a reflected wave reader function has also an infrared reception section so that it receives and decodes a control signal transmitted from an infrared remote controller, modulates a carrier based on the substance of the decoded control signal and transmits the modulated carrier to a mobile apparatus. Then, the mobile apparatus transmits data in the mobile apparatus itself as a reflected wave in accordance with the instruction. Accordingly, an operation of the mobile apparatus from the infrared remote controller is permitted, and therefore, the operability is enhanced and the distance of remote control can be increased.

In the radio communication system according to the present invention, the reflected wave reader applies modulation such as ASK modulation to the carrier with the substance of the infrared command and transmits the modulated carrier to the reflector. In response to this, the reflector places the requested data on the reflected wave of the carrier from the reflected wave reader in accordance with the instruction of the infrared command received through the reflected wave reader and transmits the requested data together with the reflected wave. The reflector here is incorporated in a mobile apparatus which serves as a data source such as, for example, a digital camera or a portable telephone set.

Further, the reflected wave reader may provide data received from the reflector to an external apparatus. The external apparatus here is incorporated in a data sink which displays and outputs or prints out data acquired from a digital camera or performs image processing of the data such as a PC or a television receiver. The reflective wave reader transmits a data request requested by an infrared command to the reflector and receives the data requested by the infrared command by reflected wave transmission from the reflector. Accordingly, by operating the reflected wave reader by means of the infrared remote controller, the infrared remote controller can read out data from a terminal apparatus such as a digital camera which includes the reflector.

Effects of the Invention

According to the present invention, a radio communication system, a radio communication apparatus and a radio communication method as well as a computer program can be provided which are superior in that data on a mobile apparatus can be read efficiently at low power consumption through reflected wave transmission.

Further, according to the present invention, a radio communication system, a radio communication apparatus and a radio communication method as well as a computer program can be provided which are superior in that reading of data from a mobile apparatus which includes a reflector function and processing of reception data such as displaying outputting can be performed efficiently with high operability.

According to the present invention, the operability of the reflected wave transmission system is enhanced. Further, since the infrared remote controller is used, increase of the distance in remote control for a terminal which includes a reflector function in a communication system which makes use of reflected wave transmission is implemented. Further, the present invention can be applied as a control method where non-contact transmission is performed only by placing a mobile apparatus.

The other objects, features and advantages of the present invention will become apparent from the following more detailed description based on an embodiment of the present invention hereinafter described and the accompanying drawings.

DESCRIPTION OF REFERENCE NUMERALS

401 ... digital camera
402 ... reflected wave reader
405 ... video cable
406 ... television set
407 ... infrared reception section
408 ... infrared remote controller
500 ... radio reception module
501 ... antenna
502 ... circulator
503 ... reception section
504 ... transmission section
505 ... communication control section
506 ... JPEG decoder
507 ... TV
508, 590 ... infrared reception section
701 ... digital camera
704 ... television set integrated with a reflected wave reader
705 ... infrared remote controller

BEST MODE FOR CARRYING OUT THE INVENTION

In the following, an embodiment of the present invention is described with reference to the drawings.

The present invention is directed to implementation of control of apparatus such as electric appliances, bulk data transmission of images and so forth and mutual communication through communication action at low power consumption in such a communication form that the transmission ratio between apparatus restricted at comparatively short distances occupies most of communications. According to the present invention, radio transmission is performed utilizing a reflected wave based on the back scatter system used in RFID.

An RFID system itself is widely known as an example of radio communication measures which can be applied only locally in the pertaining field. As a communication method between a tag and a reader/writer, an electromagnetic coupling system, an electromagnetic induction system, a radio communication system and so forth are available. The present invention relates to the radio communication system which uses a microwave of the 2.4 GHz band or the like from among the various systems.

For example, a host apparatus such as a PC or a TV receiver which has a reflected wave reader function can read data efficiently at low power consumption from a mobile apparatus such as a digital camera which has a reflector function and perform processing of reception data such as outputting of the data so as to be displayed on the screen or printing out of the data. However, an operation of the host apparatus of reading data using reflected wave transmission from the mobile apparatus and an operation of displaying and outputting the read data on the host apparatus or a like operation must be performed separately, and there is a problem that the operability is poor. For example, where an operation of a host apparatus such as a television receiver is performed using an infrared remote controller, the operation is cumbersome.

Therefore, in the present invention, a host apparatus which has a reflected wave reader function has also an infrared reception section so that it receives and decodes a control signal transmitted from an infrared remote controller, modulates a carrier based on the substance of the decoded control signal and transmits the modulated carrier to a mobile apparatus. In this instance, the mobile apparatus can transmit data in the mobile apparatus itself as a reflected wave in accordance with the instruction. Accordingly, an operation of the mobile apparatus from the infrared remote controller is permitted, and the operability is enhanced and the distance of remote control can be increased.

Figure 1:
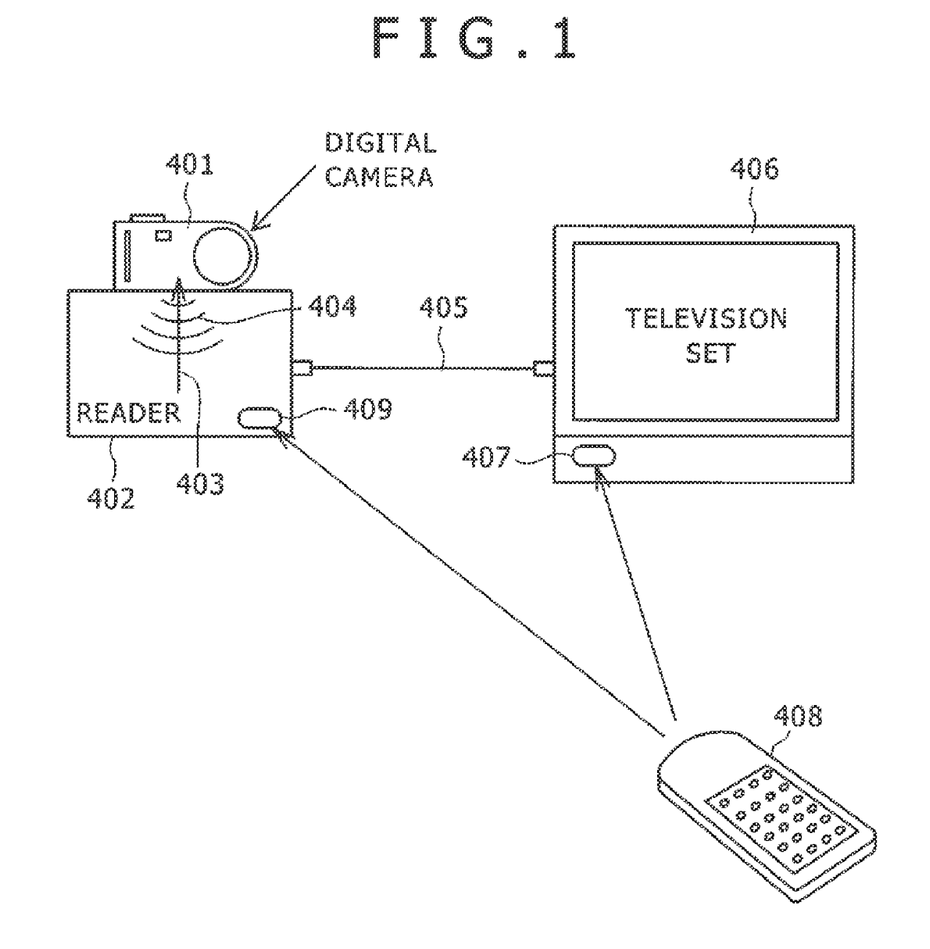
FIG. 1 is a view schematically showing a configuration of a reflected wave transmission system according to an embodiment of the present invention.

FIG. 1 schematically shows a configuration of a reflected wave transmission system according to an embodiment of the present invention.

The system shown includes a digital camera 401 with a reflected wave transmission function, a reflected wave reader 402, a television set 406, and an infrared remote controller 408. A video output of the reflected wave reader 402 is connected to an external video input terminal of the television set 406 by a video cable 405.

A non-modulated carrier 403 is transmitted from the reflected wave reader 402, and JPEG image data is returned as a reflected wave 404 from the digital camera 401.

Here, the transmission system shown in FIG. 1 is different from the conventional example in that an infrared reception section 409 is provided on the reflected wave reader 402.

The infrared remote controller 408 provides a control signal to an infrared reception section 407 of the television set 406 to perform channel changeover control of the video and can perform control of the reflected wave reader 402 and further perform control of the digital camera 401 through the reflected wave reader 402. In this manner, the user can perform operation of the television set 406 and control of the reflected wave reader 402 and the digital camera 401 of the reflected wave transmission system using the single infrared remote controller 408. Consequently, simplified and convenient operation can be achieved.

In the present embodiment, the user need not grasp the digital camera 401 to perform an operation from a remote place. Accordingly, even in a form wherein the digital camera 401 is merely placed on the reflected wave reader 402, the digital camera 401 is equivalent in practical use to the conventional example. This is so-called non-contact transmission.

Figure 2:
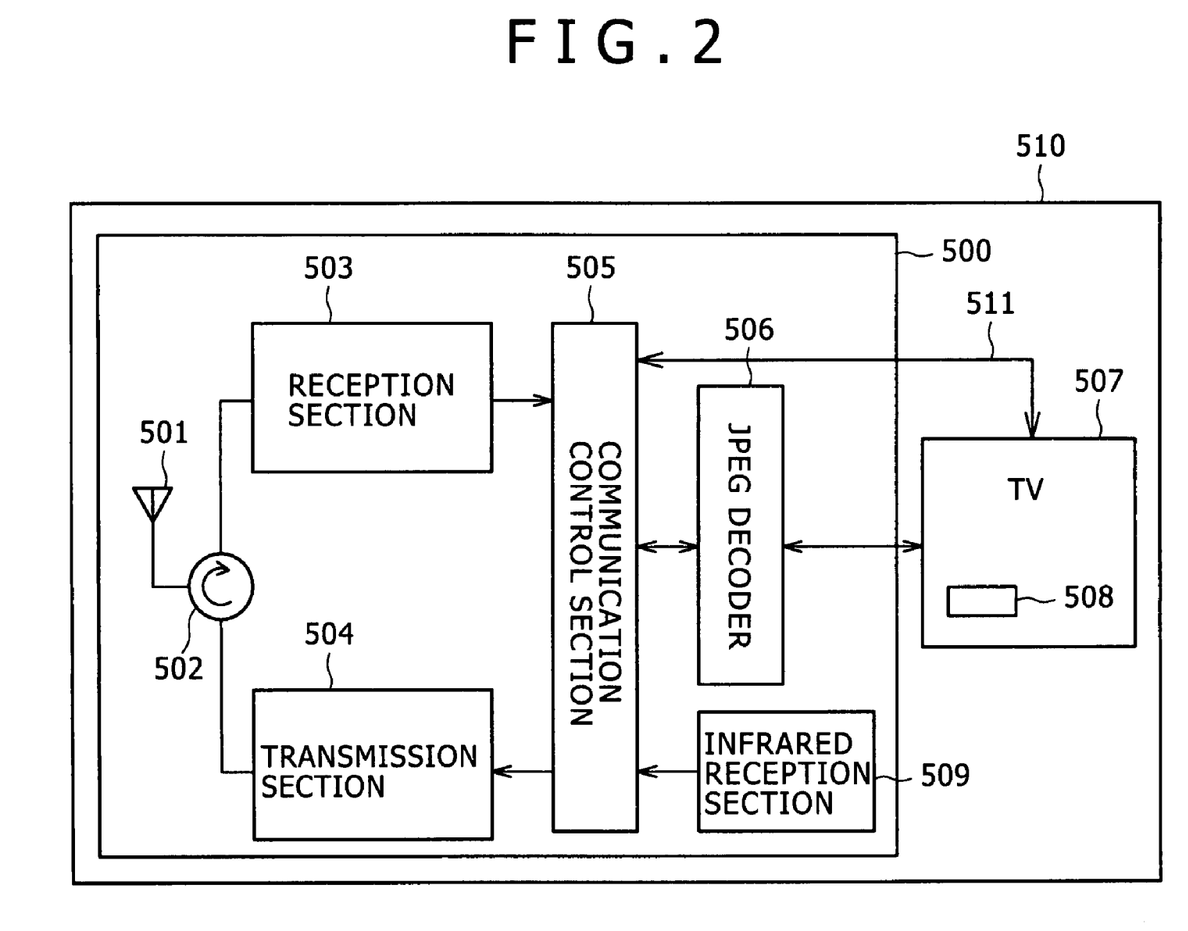
FIG. 2 is a view schematically showing a hardware configuration of a reflected wave reader for receiving transmission data from a digital camera 401 having a reflector function.

FIG. 2 schematically shows a hardware configuration of the reflected wave reader which receives transmission data from the digital camera 401 having a reflector function. However, description of the configuration and functions of the digital camera 401 is omitted here because they are similar to those described hereinabove with reference to FIG. 6.

Image data is carried on and transmitted together with a reflected wave from the digital camera 401. The reflected wave reader 500 transmits a non-modulated carrier for producing a reflected wave and performs reception and modulation of a signal reflected thereto or decoding of the image data. The reflected wave reader 500 includes an antenna 501 of the 2.4 GHz band, a circulator 502, a reception section 503, a transmission section 504, a communication control section 505, and a JPEG decoder 506.

If an instruction is provided from the communication control section 505 to the transmission section 504, then a non-modulated carrier is transmitted from the reflected wave reader 500. The non-modulated carrier outputted from the transmission section 504 is signaled from the antenna 501 through the circulator 502.

A reflected wave modulated with image data from the digital camera 401 is received by the reception section 503 through the antenna 501 and the circulator 502 and demodulated by the communication control section 505.

The data modulated by the communication control section 505 is converted from JPEG data into an analog AV signal (for example, an NTSC signal) by the JPEG decoder 506 so that an image of the data can be observed on a television set 507 connected to the reflected wave reader 500. The communication control section 505 performs also communication control with the digital camera 500 and performs transmission of a control signal of delivery confirmation information or the like by ASK through the transmission section 504.

An infrared reception section 509 is connected to the communication control section 505, and reads a control signal from the infrared remote controller 408 and transmits the control signal to the communication control section 505. The communication control section transmits the instruction from the infrared remote controller 408 as an ASK modulation signal to the digital camera 401 through the transmission section 504, circulator 502 and antenna 501.

The present control signal is received by an antenna of the digital camera 401 and ASK detected and processed.

Figure 3:
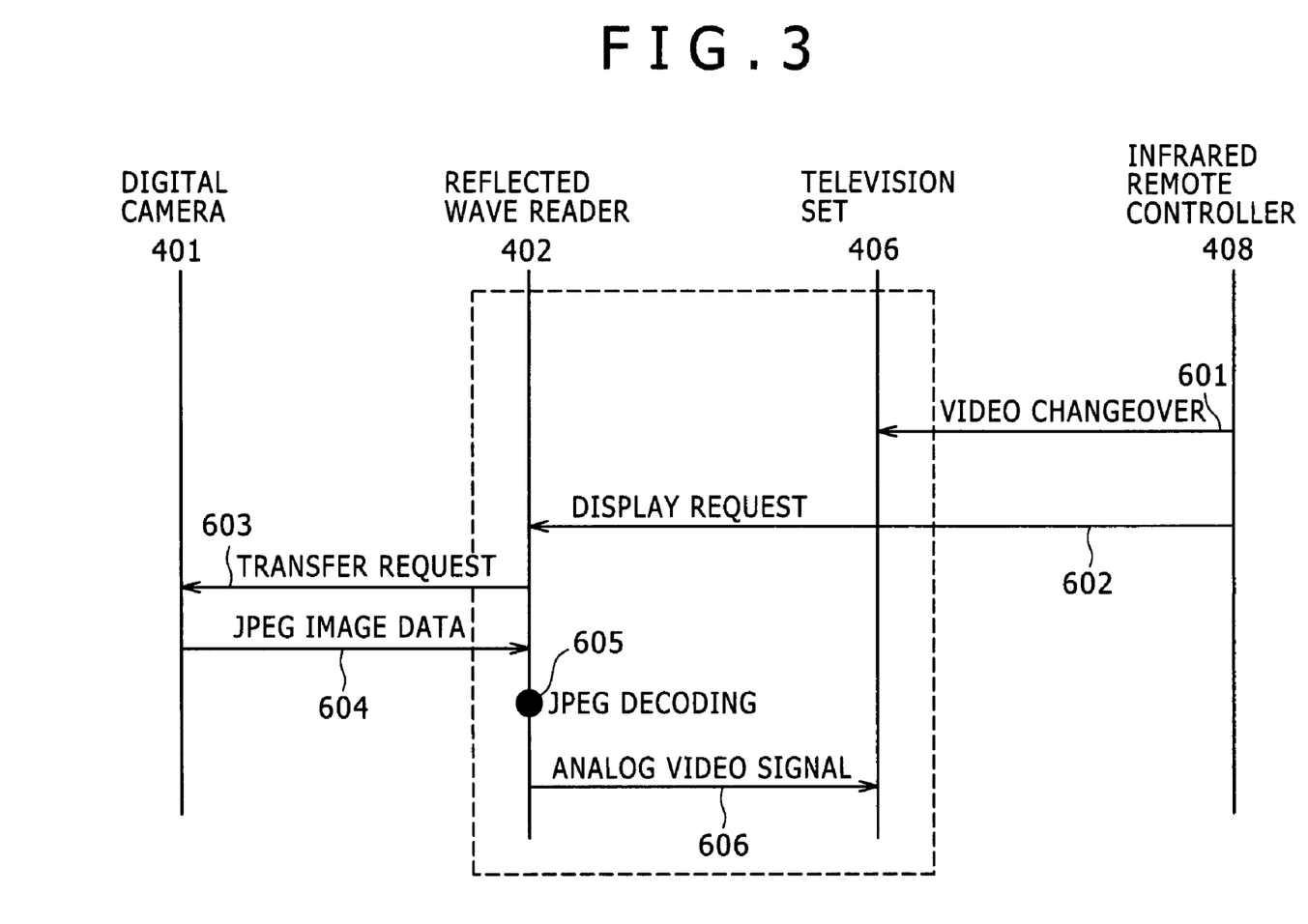
FIG. 3 is a view illustrating a control sequence in the reflected wave transmission system shown in FIG. 1.

FIG. 3 illustrates a control sequence of the control signal.

The infrared remote controller 408 sends a television changeover signal 601 to the television set 406. The television set 406 places itself into an external video input mode.

The infrared remote controller 408 subsequently sends a display request signal 602 for requesting image data to the digital camera 401 as an infrared remote control command to the reflected wave reader 402.

The reflected wave reader 402 receives and decodes the display request signal 602, and sends a request for image data to the digital camera 401 as a transfer request signal 603 of an ASK modulated carrier. Subsequently to this, the reflected wave reader 402 sends a non-modulated carrier (not shown) so that the digital camera 401 can transmit image data as a reflected wave.

The digital camera 401 receives and decodes the transfer request signal 603 sent as an ASK modulated wave, and then returns image data 604 requested thereto as a reflected wave to the non-modulated carrier from the reflected wave reader 402 to the reflected wave reader 402.

The reflected wave reader 402 receives and demodulates the image data 604 transmitted as a reflected wave and performs JPEG decoding at 605. Further, the reflected wave reader 402 converts resulting data into an analog video signal and outputs the analog video signal to the television set 406.

In the present embodiment, a case wherein a display request signal for one image is transferred is taken as an example. However, this substance may naturally be a control signal for image processing such as table display, enlargement, reduction or rotation. Further, if a video changeover signal and a display start signal are used commonly, then transmission of the video changeover signal can be omitted.

In the embodiment shown in FIGS. 1 and 2, the reflected wave reader is an apparatus independent of the television set. However, also it is possible to combine the reflected wave reader 500 and the television set 507 of FIG. 2 to form an integrated type television set 510. In this instance, the communication control section 505 of the reflected wave reader 500 and the television set 507 are connected to each other by a control line 511. By the configuration just described above, the infrared reception section 509 becomes unnecessary, and an infrared reception section 508 on the television set 507 can be used commonly. The control signal of the infrared remote controller 408 is reflected by the common infrared reception section 508, and information necessary for reflected wave transmission is transmitted from the television set 507 side to the reflected wave reader 500 side by the control line 511.

Figure 4:
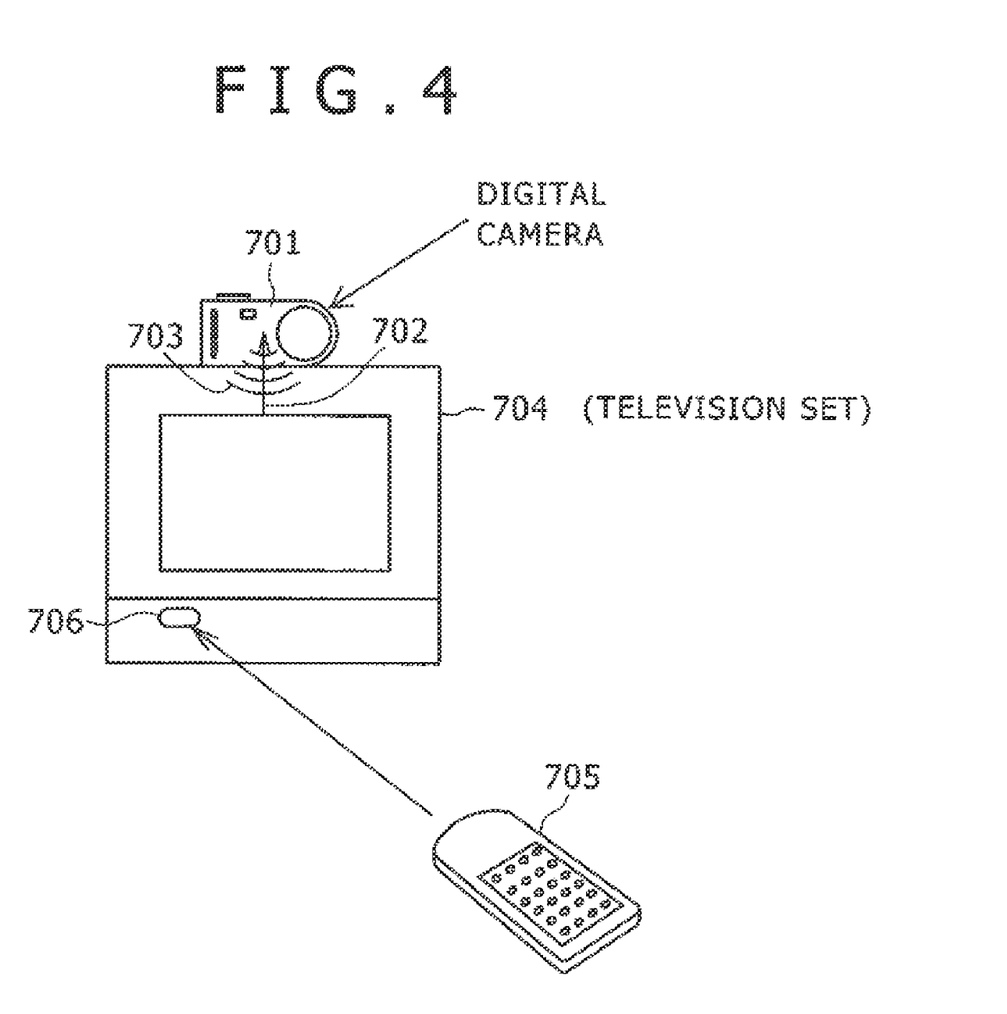
FIG. 4 is a view showing a system configuration wherein a television set integrated with a reflected wave reader is used.

FIG. 4 shows a view of a system configuration which uses a television set integrated with a reflected wave reader. In the present embodiment, the system includes a digital camera 701 with a reflected wave transmission function, a television set 704 integrated with a reflected wave reader, an infrared remote controller 705, and an infrared reception section 706.

The infrared remote controller 705 sends a video changeover signal to the television set 704 integrated with a reflected wave reader, and the television set 704 integrated with a reflected wave reader is placed into an external video input mode. The infrared remote controller 705 subsequently sends a display request signal for requesting image data to the digital camera 701 as an infrared remote control command to the television set 704 integrated with a reflected wave reader. The television set 704 integrated with a reflected wave reader receives and decodes the display request signal, and then sends a request for image data to the digital camera 701 as a transfer request signal of an ASK modulated carrier. Thereafter, the television set 704 integrated with a reflected wave reader transmits a non-modulated carrier so that the digital camera 701 can transmit image data as a reflected wave. Then, the digital camera 701 sends back the requested JPEG image data as a reflected wave 703 to the non-modulated carrier 702.

In this manner, it becomes possible to perform an operation of a television receiver and an operation of a digital video camera with a reflected wave transmission function only by means of an infrared remote controller, and the disadvantage described hereinabove can be solved.

It is to be noted that, in an uplink from a reflector to a reflected wave reader, a modulation system of a low bit rate such as ASK or BPSK is used generally. However, the subject matter of the present invention is not limited to this. By providing, upon modulation of a reflected wave, a phase difference on a signal line along which a reflected wave is transmitted back and forth in addition to an operation of the load impedance of a termination process of an antenna and so forth, a multi-value modulation system of a higher bit rate such as QPSK or eight-phase PSK modulation can be implemented. For example, in the specification of Japanese Patent Laid-Open No. 2003-352223 assigned already to the applicant of the present application, a communication system of the back scatter type in which a QPSK modulation process is incorporated is disclosed.

INDUSTRIAL APPLICABILITY

The present invention has been described in detail with reference to a particular embodiment. However, it is apparent that the embodiment can be modified or altered within the spirit and scope of the present invention.

While, in the present specification, an embodiment of the present invention is described taking a reflected wave transmission system which performs transmission of a non-modulated carrier from a reading apparatus side and modulation of transmission data on the transmission apparatus side into a reflected wave as an example, the subject matter of the present invention is not limited to this. Even where both of a medium other than reflected wave transmission and an infrared remote controller are used to operate data transfer, action and effects similar to those described above can be exhibited by applying the present invention.

In summary, the present invention has been disclosed in the form of illustration, and the substance described in the present specification shall not be interpreted restrictively. In order to decide the subject matter of the present invention, the claim should be referred to.

The invention claimed is:

1. A back scatter type radio communication system comprising a reflected wave reader and a reflector, in which the reflected wave reader is operable to transmit a carrier and in which the reflector is operable to cause a reflected wave to be transmitted which is formed by modulating the carrier in accordance with transmission data that includes Joint Photographic Experts Group (JPEG) data generated by a digital camera, wherein
said reflected wave reader includes an infrared reception section configured to receive an infrared command, a demodulator section for demodulating the reflected wave received from the reflector, an image decoding section for decoding the JPEG data received from the reflector into an analog visual signal, and
an infrared command decoding section configured to decode the infrared command and controls a reflected wave transmission action in response to the infrared command.

2. The back scatter type radio communication system according to claim 1, wherein
said reflected wave reader modulates the carrier with the substance of the infrared command and transmits the modulated carrier to said reflector.

3. The back scatter type radio communication system according to claim 2, wherein
said reflector places the transmission data on the reflected wave of the carrier from said reflected wave reader in accordance with an instruction of the infrared command received through said reflected wave reader and transmits the transmission data together with the reflected wave.

4. The back scatter type radio communication system according to claim 3, wherein
said reflected wave reader provides data received from said reflector to an external apparatus.

5. A reflected wave reader usable in a back scatter type radio communication system which performs reflected wave communication making use of modulation of a reflected wave, from a reflector, of a carrier, comprising:
a transmission section configured to transmit the carrier;
a reception section configured to perform a reception process of the modulated reflected wave, from said reflector, of the transmitted carrier, said modulated reflected wave modulated with JPEG data generated by a digital camera;
an infrared reception section configured to receive an infrared command;
an infrared command decoding section configured to decode the infrared command; and a communication control section configured to control a reflected wave transmission action in response to the infrared command, and,
wherein said reception section further comprises demodulating said reflected wave and decoding the JPEG data into analog visual data.

6. The reflected wave reader according to claim 5, wherein said communication control section modulates the carrier with a data request requested by the infrared command and transmits the modulated carrier to said reflector.

7. The reflected wave reader according to claim 6, wherein said communication control section receives the data requested by the infrared command through reflected wave transmission from said reflector.

8. The reflected wave reader according to claim 7, further comprising:
an external apparatus connection section configured to connect an external apparatus which utilizes data; and wherein
said communication control section provides the data received from said reflector by the reflected wave transmission to the external apparatus.

9. A radio communication method for use by a reflected wave reader usable in a back scatter type communication system for performing reflected wave communication making use of modulation of a reflected wave, from a reflector, of a carrier, comprising:
an infrared reception step of receiving an infrared command;
an infrared command decoding step of decoding the infrared command; and
a reflected wave transmission step of performing a transmission action of the reflected wave or data from said reflector and a reception action of the reflected wave from said reflector in response to the infrared command, wherein said reflected wave from said reflector is modulated with JPEG data generated by a digital camera, and wherein said reception action further comprises demodulating said reflected wave and decoding the JPEG data into analog visual data by said reflected wave reader.

10. The radio communication method according to claim 9, wherein, at the reflected wave transmission steps, a data request requested by the infrared command is transmitted to said reflector.

11. The radio communication method according to claim 10, wherein, at the reflected wave transmission step, the data requested by the infrared command is transmitted by reflected wave transmission from said reflector.

12. The radio communication method according to claim 11, further comprising:

a data providing step of providing the data received from said reflector by the reflected wave transmission to an external apparatus.

13. A back scatter type radio communication system comprising:

a camera section for capturing image data;

a signal processing section for converting said image data into a predetermined digital format;

a Universal Serial Bus (USB) interface section for interfacing with an external PC and for transferring said converted image data to said external PC; and, a radio transmission module including a reflector and an antenna, wherein said reflector is configured to receive, via said antenna, a carrier wave from a reflected wave reader and to transmit, via said antenna, a reflected wave back to said reflected wave reader using back scatter communication, where said reflected wave is formed by modulating said carrier with said converted image data, and wherein said reflected wave reader includes a demodulator section for demodulating the reflected wave received from the reflector, and an image decoding section for decoding JPEG data received from the reflector into an analog visual signal.

* * * * *